US012675523B2

(12) United States Patent
Soroushian et al.

(10) Patent No.: US 12,675,523 B2
(45) Date of Patent: Jul. 7, 2026

(54) CHUNK HEADER INCORPORATING BINARY FLAGS AND CORRELATED VARIABLE-LENGTH FIELDS

(71) Applicant: DIVX, LLC, San Diego, CA (US)

(72) Inventors: Kourosh Soroushian, San Diego, CA (US); Shaiwal Priyadarshi, San Diego, CA (US); Jason Braness, San Diego, CA (US); Roland Osborne, San Francisco, CA (US); William Frantz, San Diego, CA (US); Jerome Vashisht-Rota, San Diego, CA (US); Daniel Salmonsen, Carlsbad, CA (US); John Funnell, Chandlers Ford (GB); Michael Floyd, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 19/030,477

(22) Filed: Jan. 17, 2025

(65) Prior Publication Data

US 2025/0165520 A1     May 22, 2025

Related U.S. Application Data

(60) Continuation of application No. 18/502,804, filed on Nov. 6, 2023, now Pat. No. 12,242,527, which is a continuation of application No. 18/053,312, filed on Nov. 7, 2022, now Pat. No. 11,847,154, which is a continuation of application No. 17/015,970, filed on Sep. 9, 2020, now Pat. No. 11,494,428, which is a division of application No. 16/551,459, filed on Aug. 26, 2019, now Pat. No. 10,803,113, which is a continuation of application No. 15/888,685, filed on Feb. 5, 2018, now Pat. No. 10,394,879, which is a continuation of application No. 14/594,005, filed on (Continued)

(51) Int. Cl.
| | |
|---|---|
| *H04N 9/80* | (2006.01) |
| *G06F 16/438* | (2019.01) |
| *G11B 27/10* | (2006.01) |
| *G11B 27/30* | (2006.01) |
| *G11B 27/34* | (2006.01) |
| *H04L 67/10* | (2022.01) |
| *H04N 9/79* | (2006.01) |
| *H04N 5/76* | (2006.01) |

(52) U.S. Cl.
CPC ........ *G06F 16/4393* (2019.01); *G11B 27/105* (2013.01); *G11B 27/30* (2013.01); *G11B 27/34* (2013.01); *H04L 67/10* (2013.01); *H04N 9/79* (2013.01)

(58) Field of Classification Search
CPC    H04N 9/80; H04N 5/783; H04N 5/76; H04N 9/88; H04N 7/14; H04N 9/14
USPC ............. 386/343, 351, 241; 348/14.08, 578; 375/240.27, 240.26
See application file for complete search history.

(56) References Cited

U.S. PATENT DOCUMENTS

| | | | | |
|---|---|---|---|---|
| 2002/0032747 A1* | 3/2002 | Toki | ........................ | H04L 67/06 709/217 |
| 2005/0114290 A1* | 5/2005 | Borthakur | ........... | G06F 16/1734 |
| 2009/0028142 A1* | 1/2009 | Schmidt | ............. | H04N 21/6437 370/389 |

* cited by examiner

*Primary Examiner* — Daquan Zhao
(74) *Attorney, Agent, or Firm* — KPPB LLP

(57) ABSTRACT

Playback and distribution systems and methods for multimedia files are provided. The multimedia files are encoded with flags associated with the content data of the multimedia files. Through the use of the flags, playback of the content is enhanced without significantly increasing the file size of the multimedia file.

20 Claims, 11 Drawing Sheets

Related U.S. Application Data

Jan. 9, 2015, now Pat. No. 9,886,438, which is a continuation of application No. 13/662,687, filed on Oct. 29, 2012, now Pat. No. 8,942,548, which is a continuation of application No. 12/272,782, filed on Nov. 17, 2008, now Pat. No. 8,301,793.

(60) Provisional application No. 60/988,622, filed on Nov. 16, 2007.

SI = Segment Index
H = Track Headers
B = Interleaved bit-stream chunks
I = Tracks' Index data
A = Auxiliary data H = Track Headers
B = Interleaved bit-stream chunks
I = Tracks' Index data
A = Auxiliary data E = Element ID (variable # bytes)
S = Payload size (variable # bytes)
P = Payload (variable # bytes based on S)

CHUNK HEADER INCORPORATING BINARY FLAGS AND CORRELATED VARIABLE-LENGTH FIELDS

CROSS-REFERENCE TO RELATED APPLICATIONS

The present application is a continuation of U.S. patent application Ser. No. 18/502,804, filed Nov. 6, 2023, entitled "Chunk Header Incorporating Binary Flags and Correlated Variable-Length Fields" to Soroushian et al., issued on Mar. 4, 2025 as U.S. Pat. No. 12,242,527, which is a continuation of U.S. patent application Ser. No. 18/053,312, filed Nov. 7, 2022, entitled "Chunk Header Incorporating Binary Flags and Correlated Variable-Length Fields" to Soroushian et al., issued on Dec. 19, 2023 as U.S. Pat. No. 11,847,154, which is a continuation of U.S. patent application Ser. No. 17/015, 970, filed Sep. 9, 2020, entitled "Chunk Header Incorporating Binary Flags and Correlated Variable-Length Fields" to Soroushian et al., issued on Nov. 8, 2022 as U.S. Pat. No. 11,494,428, which is a divisional of U.S. patent application Ser. No. 16/551,459, filed Aug. 26, 2019, entitled "Chunk Header Incorporating Binary Flags and Correlated Variable-Length Fields" to Soroushian et al., issued on Oct. 13, 2020 as U.S. Pat. No. 10,803,113, which is a continuation of U.S. patent application Ser. No. 15/888,685, filed Feb. 5, 2018, entitled "Chunk Header Incorporating Binary Flags and Correlated Variable-Length Fields" to Soroushian et al., issued on Aug. 27, 2019 as U.S. Pat. No. 10,394,879, which is a continuation of U.S. patent application Ser. No. 14/594, 005, filed Jan. 9, 2015, entitled "Chunk Header Incorporating Binary Flags and Correlated Variable-Length Fields" to Soroushian et al., issued on Feb. 6, 2018 as U.S. Pat. No. 9,886,438, which is a continuation of U.S. patent application Ser. No. 13/662,687, filed Oct. 29, 2012, entitled "Chunk Header Incorporating Binary Flags and Correlated Variable-Length Fields," to Soroushian et al., issued on Jan. 27, 2015 as U.S. Pat. No. 8,942,548, which application is a continuation of U.S. patent application Ser. No. 12/272,782, filed Nov. 17, 2008, entitled "Chunk Header Incorporating Binary Flags and Correlated Variable-Length Fields," to Soroushian et al., issued on Oct. 30, 2012 as U.S. Pat. No. 8,301,793, which claims priority under 35 U.S.C 119(e) to U.S. Provisional Application No. 60/988,622, entitled "Chunk Header Incorporating Binary Flags and Correlated Variable-Length Fields," filed Nov. 16, 2007, the disclosures of which are expressly incorporated by reference herein in their entirety.

BACKGROUND

The present invention relates generally to multimedia files and more specifically to multimedia containers and systems for encoding and decoding multimedia containers.

A multimedia engagement typically entails the decoding and presentation of audio, video, and subtitle information in a synchronized manner. In general, each one of the individual parts making up the presentation is previously encoded as a separate elementary stream and is then multiplexed together in an encapsulating container. The Audio-Video-Interleave (AVI) container specified by Microsoft Corporation of Redmond, Washington is one such encapsulation format, and is also one of the most prevalent forms of distributing standard-definition downloadable content on the Internet and peer-to-peer networks. The Matroska (MKV) container specified by a group of Open-source Enthusiasts and published by Core Codec is another such encapsulation format, and is also one of the most prevalent forms of distributing high-definition downloadable content on the Internet and peer-to-peer networks.

At its most basic level, the AVI container is made up of chunks and lists, each of which start with a four-character code (32-bit) identifier followed by a size indicator (32-bit) for that particular section. AVI lists generally contain information about the file and encapsulate other chunks, where the chunks are typically used to encapsulate the elementary audio, video, and subtitle data streams. A typical AVI chunk is illustrated in FIG. 1A. The AVI chunk 10 includes a four-character code identifier 12, a size indicator 14 and chunk data. The character code identifier can be expressed in the form nnxx, where nn is a stream number and xx is the stream designator.

The AVI container specification includes two mandatory lists, which define the format of the streams and the stream data, respectively. AVI containers can also include an index chunk, which gives the location of data chunks within an AVI container. An AVI container with these components has the following form:

```
RIFF('AVI'
    LIST ('hdrl' ... )
    LIST ('movi' ... )
    ['idx1' (<AVI Index>) ]
)
```

A decoder typically decodes multimedia information contained within an AVI container by parsing the 'hdrl' list to obtain information about the elementary streams contained within the AVI container. Once the 'hrdl' list has been parsed, the multimedia information can be rendered from the start of the 'movi' list. The 'idx1' chunk can be used to perform, so called "trick play", functions such as seeking, rewinding or fast forwarding. Information contained within the 'idx1' chunk can be used by a player to locate chunks containing multimedia information sought by a trick play function.

At its most basic level, the MKV container is made up of elements, with most elements able to nest some other elements. FIG. 1B illustrates such a typical MKV container. The element type is defined by a variable-length integer identifier and the element's size by a variable-length integer size field, followed by the corresponding data bytes whose length is determined by the size field. The container has standard element types that can be used to carry a variety of payloads, such as headers 17, bit streams 18, different types of indexes (e.g., segment and track indexes 13, 15) and auxiliary data 19.

SUMMARY

Embodiments of the invention utilize a modified form of the AVI chunk header that incorporates one or more bit-level flags and zero or more data fields, the content of which are indicated by the flag settings. Embodiments also utilize a series of newly introduced element types, with new element identifiers of the MKV container, that incorporate zero or more data fields, the content of which are indicated by the element identifier. Each new flag of AVI, new element of MKV or similar new addition to a container format and the data field(s) have a pre-defined meaning, such that when interpreted correctly may provide a new feature to multimedia systems. The flags and data fields are extensible to incorporate new features as required. In many embodiments, the flags enable the playing of content within a chunk and/or performance of trick play functions and other functionality without the need to obtain information from elsewhere in the container. Trick play functions are functions that involve playing portions of a multimedia sequence in a non-sequential fashion. For example, functions such as fast forward and rewind involve achieving the appearance that the multimedia sequence is playing at a specified speed by skipping frames. Other trick play functions can include, but are not limited to, skipping between chapters and/or scenes defined within a multimedia sequence.

In one embodiment, a method of playing back content by a playback device stored in a media file supplied by a media server. The method comprises providing a media file having content data and header, the content data having a plurality of media frames and the header having a plurality of flags or elements; decoding the content data by a playback device; displaying content on a display screen from the decoded content data; receiving a user request; identifying a flag or element from the plurality of flags or elements based on the received user request; and decoding one or more media frames from the subset of the plurality of media frames based on the identified flag or element.

In another embodiment, a playback device for decoding a media file is provided. The device comprises a de-multiplexer arranged to receive and decipher a media file having content data and a header having a plurality of flags or uniquely defined elements. The device also comprises a video decoder coupled to the de-multiplexer and arranged to receive video portions of the deciphered media file and an audio decoder coupled to the de-multiplexer and arranged to receive audio portions of the deciphered media file. The de-multiplexer selects the video portions and the audio portions to be transmitted to the respective video and audio decoder based on the plurality of flags or uniquely defined elements from the deciphered media file.

The above-mentioned and other features of this invention and the manner of obtaining and using them will become more apparent, and will be best understood, by reference to the following description, taken in conjunction with the accompanying drawings. The drawings depict only typical embodiments of the invention and do not therefore limit its scope.

DETAILED DESCRIPTION

Turning now to the drawings, multimedia containers in accordance with embodiments of the invention that include chunks with headers containing flags and data fields that describe data within the chunk are shown. In several embodiments, the chunk headers include a series of flags and data fields, where the flags indicate the nature of the information contained in the data fields. In many embodiments, the flags and data fields enable simplification of the decoding of the multimedia information contained within the container. In a number of embodiments, a player need not obtain an entire multimedia file in order to seek within the file, commence playing content, and/or perform trick play or other functions.

Figure 1A:
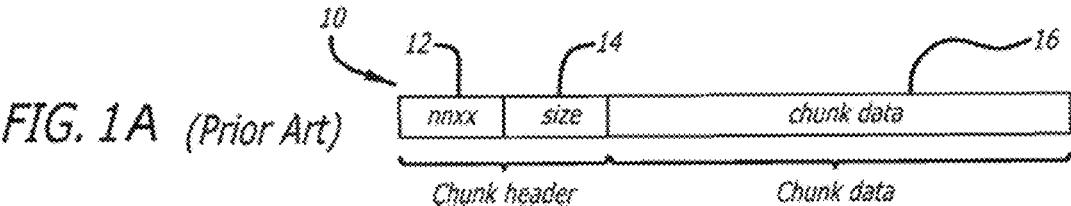
FIG. 1A is a conceptual illustration of the data in an Audio-Video-Interleave (AVI) container.
Figure 1B:
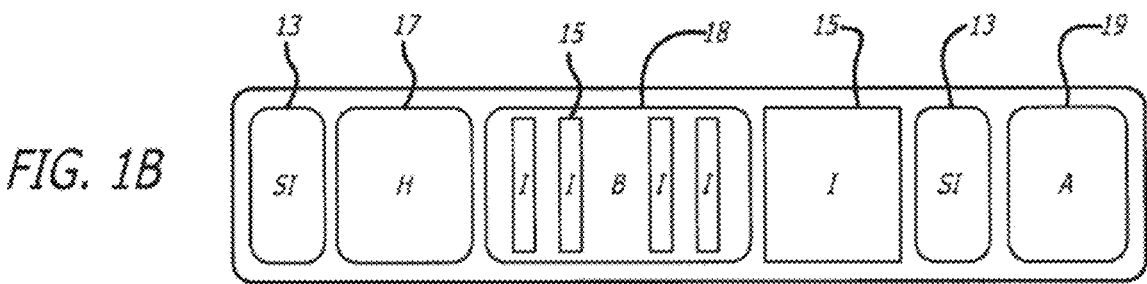
FIG. 1B is a conceptual illustration of the data in a Matroska (MKV) container.
Figure 1C:
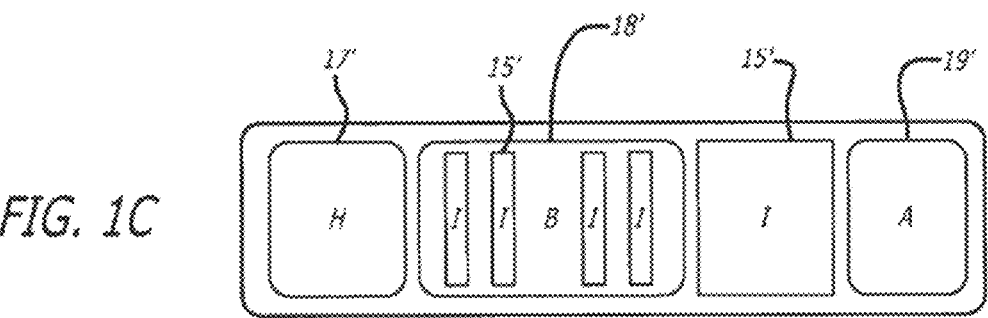
FIG. 1C is a conceptual illustration of data in a generic container.
Figures 2A, 2B:
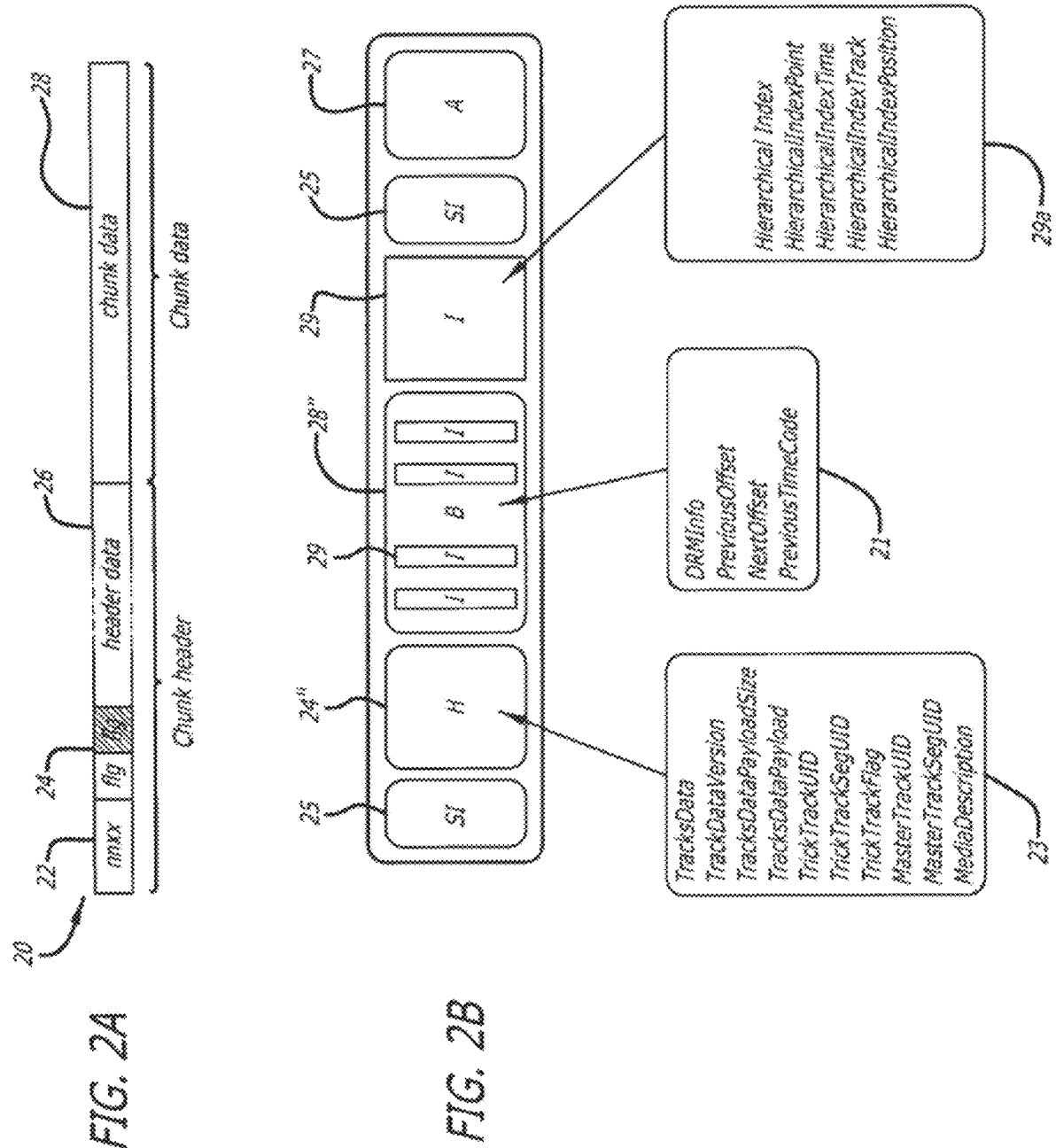
FIG. 2A is a conceptual illustration of data within a chunk in accordance with an embodiment of the invention.
FIG. 2B is a conceptual illustration of data within a modified container format in accordance with one embodiment of the invention.

Containers in accordance with embodiments of the invention are typically variations of the AVI, MKV or other similar container, such as shown in FIG. 1c, and are composed of lists, chunks and/or elements. The container in FIG. 1c includes a track header 17', followed by an interleaved bit-stream chunk 18' and tracks' index data 15'. Tracks' index data 15' is also incorporated in the interleaved bit-stream chunk 18'. An auxiliary data 19' follows the interleaved bit-stream. A chunk in accordance with an embodiment of the invention is shown in FIG. 2a. The chunk 20 includes a chunk header that is made up of a character code identifier 22, a series of flags 24 and header data fields 26. The chunk 20 also includes chunk data 28. The character code identifier 22 is similar to that of a conventional AVI character code identifier in the form nnxx, where nn is a stream number and xx is the stream designator.

The flags can be structured in any of a variety of ways. In the illustrated embodiment, the flags are 8-bit flags. Each 8-bit flag may be further subdivided into sub-flags, which are at least 1 bit wide, and may hold specific significance for the current chunk and/or the following or previous chunks. The sub-flags may also designate a series of follow-on data fields in the header data field 26, or alternatively refer to a data field stored in a separate section of the file. The sub-flags may also be grouped into more than one bit, and may span several 8-bit flags. One of the sub-flags may indicate a follow-on 8-bit flag, such that an infinite number of flags can be presented in the chunk header. The data in the first flag typically has a higher importance and in general must be present for all chunks to operate correctly.

A set of header data fields 26 follows the flags. In a number of embodiments, the size and number of header data fields 26 vary and the flags 24 indicate the composition of the header data fields. In other embodiments, the header data fields 26 are a fixed size and the allocation of bits is indicated by the flags 24.

As discussed above, the chunk data 28 can contain any type of information. Chunks that contain multimedia information, such as chunks within a 'movi' list of container modified in accordance with an embodiment of the present invention, contain information from one or more of the elementary streams. In several embodiments, the flags 24 and the header data fields 26 provide information concerning the nature of the chunk data and/or the manner in which the chunk data should be handled by a player.

Another container in accordance with an embodiment of the invention is also shown in FIG. 2b. Similar to that illustrated in FIG. 2a, the container includes a header 24" that includes flags and data fields 23. In one embodiment, the flags and/or data fields 23 includes additional track information regarding the tracks, e.g., a trick play track or master track (Tracks Data, Tracks Data Version, Tracks Data Payload Size, Tracks Data Payload, Trick Track Unique Identifier, Trick Track Segment Unique Identifier, Trick Track Flag, Master Track Unique Identifier, Master Track Segment Unique Identifier and a Media Description). Interleaved bit-stream chunks/blocks, data 28", follow. Track index data 29, auxiliary data 27 and segment index 25 are also included and in one embodiment provide information similar those found in a standard container. In other embodiments, the track index data 29 includes or is entirely composed of hierarchical index information 29a and the interleaved bit-stream chunks include DRM and Seek (Forward and Backward) information 21 (DRMInfo, Previous Offset, Next Offset, Previous Time Code) discussed in greater detail below. The Hierarchical index information includes elements of a Hierarchical Index with Hierarchical Index Points, Time, Track and Position). The hierarchical index information and use thereof are described in greater detail in U.S. Provisional Application No. 60/988,513, filed Nov. 16, 2007 and the corresponding non-provisional application entitled "Hierarchical and Reduced Index Structures for Multimedia files", filed Nov. 17, 2008 that claims the benefit of the provisional application. The entire disclosures of these applications are hereby incorporated by reference as if set in full herein.

6

Figures 2C, 3:
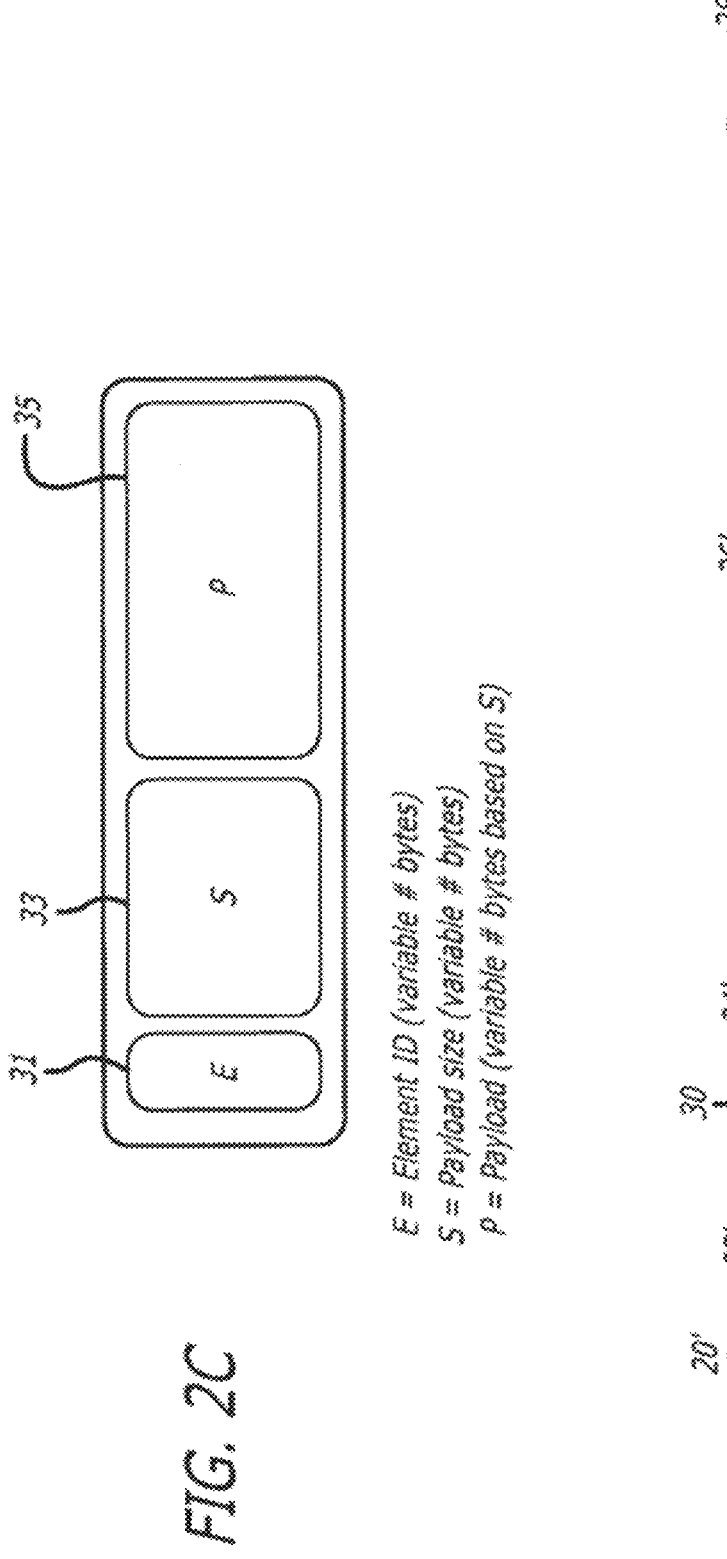
FIG. 2C is a conceptual illustration of data within an element in accordance with one embodiment of the invention.
FIG. 3 is a conceptual illustration of a chunk in accordance with another embodiment of the invention that includes a mandatory size field.

In one embodiment, the forward/backward, hierarchical index, DRM and other similar features are introduced as elements into the container. An example of such an element is shown in FIG. 2C. The element includes an element identifier 31, payload size 33 and a payload 35, each of which have variable lengths (variable number of bytes), but the payload length is based on the value of the payload size 33. Examples of the element identifiers are provided in the following tables.

| DRM RELATED IDENTIFIERS | |
|---|---|
| ELEMENT_TRACKSDATA_ID | 0xDA |
| ELEMENT_TRACKSDATA_VER_ID | 0xDB |
| ELEMENT_TRACKSDATA_PSIZE_ID | 0xDC |
| ELEMENT_DRMINFO_ID | 0xDD |
| ELEMENT_TRACKSDATA_PAYLOAD_ID | 0xDE |

| TRICK PLAY TRACK IDENTIFIERS | |
|---|---|
| ELEMENT_ENHANCEDTRACK_UID_ID | 0xC0 |
| ELEMENT_ENHANCEDTRACK_SEGUID_ID | 0xC1 |
| ELEMENT_ENHANCEDTRACK_FILENAME_ID | 0xC2 |
| ELEMENT_MASTERTRACK_SEGUID_ID | 0xC4 |
| ELEMENT_MASTERTRACK_FILENAME_ID | 0xC5 |
| ELEMENT_ENHANCEDTRACK_FLAG_ID | 0xC6 |
| ELEMENT_MASTERTRACK_UID_ID | 0xC7 |

| PREVIOUS AND NEXT REFERENCE FRAME IDENTIFIERS | |
|---|---|
| ELEMENT_PREVIOUS_REF_FRAME_ID | 0xC8 |
| ELEMENT_PREVIOUS_REF_FRAME_OFFSET | 0xC9 |
| ELEMENT_PREVIOUS_REF_FRAME_TIMECODE | 0xCA |
| ELEMENT_NEXT_REF_FRAME_ID | 0xCB |
| ELEMENT_NEXT_REF_FRAME_OFFSET | 0xCC |
| ELEMENT_NEXT_REF_FRAME_TIMECODE | 0xCD |

| HIERARCHICAL INDEX IDENTIFIERS | |
|---|---|
| ELEMENT_HIERARCHICAL_INDEX_ID | 0x2AD1D3 |
| ELEMENT_HIERARCHICAL_INDEX_POINT_ID | 0x30A1D9 |
| ELEMENT_HIERARCHICAL_INDEX_TIME_ID | 0x4A10 |
| ELEMENT_HIERARCHICAL_INDEX_POSITIONS_ID | 0x4A11 |
| ELEMENT_HIERARCHICAL_INDEX_TRACK_ID | 0x4A12 |
| ELEMENT_HIERARCHICAL_INDEX_CUEPOS_ID | 0x4A13 |

Utilizing the element identifier 31 similar to the flags and the payload 35 similar to the data fields, a playback device can identify and decode the appropriate data to implement the desired features, e.g., forward/backward, content filtering, etc. For example, in one embodiment, an element identifier 31 is read and recognized by the playback device. The media file is read or parsed to match a sequence against the table of valid element IDs. Once recognized, i.e., a match, the element located and processes up to the size of the payload as provided by the payload size 33.

In operation, the flags, data fields and elements included in the headers or interleaved in the bit stream in accordance with embodiments of the invention can provide a player attempting to decode the chunk with information concerning the data located within the chunk. The more detailed the information provided in the header, the less information that the player must obtain from elsewhere in the file to play multimedia information contained within the chunk. In this way, the headers in accordance with embodiments of the invention can reduce the volume of data that a player must obtain from a multimedia file in order to perform functions such as seeking to a point within the multimedia file, playing multimedia information from an arbitrary point within a multimedia file and/or performing trick play functions with respect to multimedia content contained within a multimedia file. Examples of specific pieces of information that can be included in headers in accordance with embodiments of the invention to assist players in the decoding of chunk data are discussed further below. It should be noted that for the AVI container format and/or other similarly structured formats, bit-wise flags and associated data fields are incorporated into new or existing chunks. For the MKV container format and/or other similar types, new elements with unique identification fields, size and/or data fields are added to the bit stream.

Size

Figures 4A, 4B:
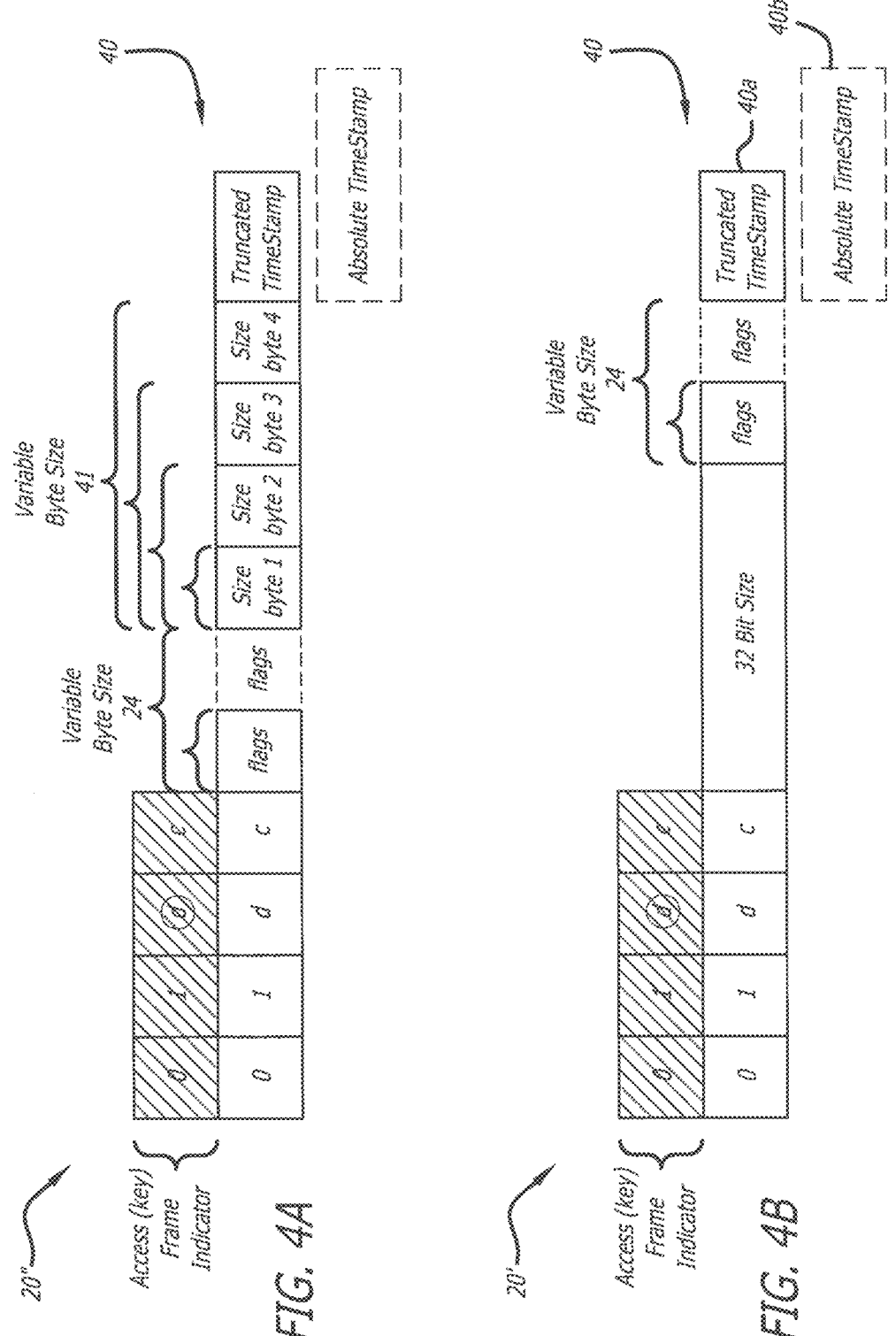
FIGS. 4A and B are conceptual illustrations of chunk headers including chunk size information and time stamp information in accordance with embodiments of the invention.

A conventional AVI chunk header includes a field that contains information concerning the size of the chunk. A static field is one way of representing size information. A chunk header in accordance with an embodiment of the invention that includes such a size value field 30 is shown in FIGS. 3 and 4b. In other embodiments, other representations can be used that utilize bits within the flags (i.e., sub-flags) to support variations in the size value field. A chunk header in accordance with an embodiment of the invention that includes a size value field 41 that can itself vary in size is shown in FIG. 4a. In many embodiments, the flags in a chunk header contain a first bit that indicates whether the size of the chunk is stored as fixed numbers in a different segment of the file, or alternatively if the size is contained within the header data fields following the flags. Two additional bits can indicate a look-up index for fixed numbers, or the number of bytes used when an actual size value is represented. Indexing to fixed numbers within the chunk header to represent the size of a chunk can significantly reduce overhead when a series of chunks are the same size, such as chunks containing a constant bit rate elementary stream. In other embodiments, any number of sub-flags can be used to indicate one of a variety of different configurations of the size value field.

Timestamp

A conventional AVI chunk header does not typically include a time stamp. As a result, a player often must rely heavily on the index contained within an AVI container in order to locate corresponding audio, video and/or subtitle chunks. Including time stamp information in a chunk header in accordance with an embodiment of the invention can enable players to locate corresponding audio, video and/or subtitle chunks without reference to an index. In addition, the existence of a timestamp can aid in a synchronized presentation in case of errors present in the file due to transmission or storage problems. Both the chunk header structures shown in FIGS. 4a and 4b are examples of chunk headers in accordance with embodiments of the invention that include a data field 40 containing time stamp information.

In many embodiments, time stamp information is mandatory and a sub-flag indicates whether or not the time stamp information is truncated 40a or absolute 40b. The truncated time stamp may have a resolution that is smaller than the absolute timestamp, thus allowing fewer bits to be used at the cost of tighter requirements on the synchronization ambiguity. Hence if the truncated timestamp is 16-bits wide and is in the units of milliseconds, it may at most represent a time value of 65.535 seconds, while if in the units of ⅟₉₀,₀₀₀, the 16 bits allow for a resolution of only 0.728 seconds. In the latter case, the maximum distance between corresponding audio and video samples must be less than half of 0.728 seconds; otherwise, it will be impossible to unambiguously determine the relationship between the corresponding audio and video packets. Thus, in the case where a truncated time stamp is used it is important to ensure that any uncertainties in the synchronization remain below the maximum value that can be expressed by an associated truncated time stamp. Likewise the absolute timestamp may have a resolution of at least 32 bits or larger, and may represent the maximum amount of time from the start of an AVI chunk to the last chunk in a contiguous movie presentation. The timescale for both timestamp representations may be pre-determined, or alternatively specified in a separate section of the file.

Flags

Figure 5:
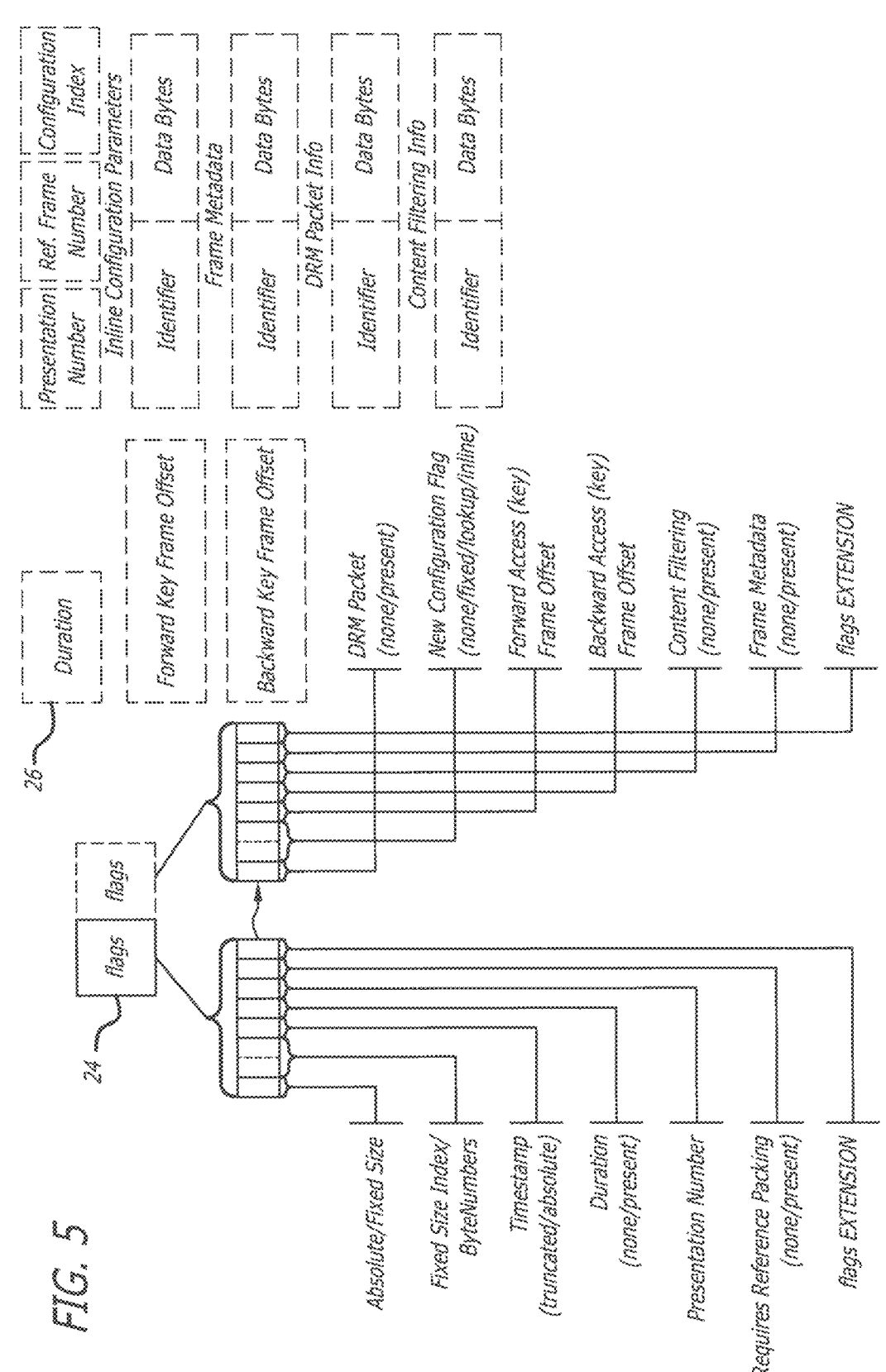
FIG. 5 is a conceptual illustration of flags and corresponding data fields that can be included in a chunk header in accordance with an embodiment of the invention.

Although the embodiments shown in FIGS. 4a and 4b include two flag fields, many embodiments of the invention include multiple sub-flags and potentially multiple data fields. Flags and data fields that can be included in chunk headers in accordance with an embodiment of the invention are shown in FIG. 5. The flags 26 include a plurality of sub-flags, each of which provides information concerning chunk data and/or header data fields 28. The sub-flags relating to Absolute-Fixed Size, Fixed Size Index/Byte Numbers, Timestamp (truncated/absolute) have been described above. Additional flags that can form part of a chunk header include Duration (none/present), Presentation Number, Requires Reference Packing (none/present), flags EXTENSION, DRM Packet (none/present), New Configuration Flag (none/fixed/lookup/inline), Forward Access Key Frame Offset (key), Backward Access Key Frame Offset (key), Content Filtering (none/present), Frame Metadata (none/present), and flags EXTENSION. These flags are discussed below. Although a specific set of flags and associated data fields is shown in FIG. 5, other sets of flags and/or data fields can be used in accordance with embodiments of the invention. In particular, any flag and/or data field can be included in a chunk header in accordance with an embodiment of the invention that provides a player with information concerning the decoding of a chunk that the player would otherwise have been required to obtain from another chunk had a conventional AVI chunk header been used.

Duration Sub-Flag

The Duration sub-flag signals the availability of a duration data field in the header-data, determining the amount of time a chunk should be presented after decoding. This value is typically equal to the difference between the timestamp of two consecutive chunks, except in certain cases where the streams are non-continuous (such as subtitles or meta-data). The duration may be in the same timescale as the timestamp values, and may have a predetermined value that is typically 8, 16, 24 or 32 bits in size, but may be of a different size.

It should be noted that Duration, Size and Timestamp information as described above may not be needed in all container formats, e.g., MKV, may already include implementations to supply the appropriate information. However, such implementations are specific to the container format and/or static. As such, unlike utilizing bits within flags to support variations in a data field, those implementations may not be extensible to apply to multiple and varied types of container formats or alternatively may use other means of incorporating new elements in an existing specification.

Packing Reference Frame Flags

Figure 6:
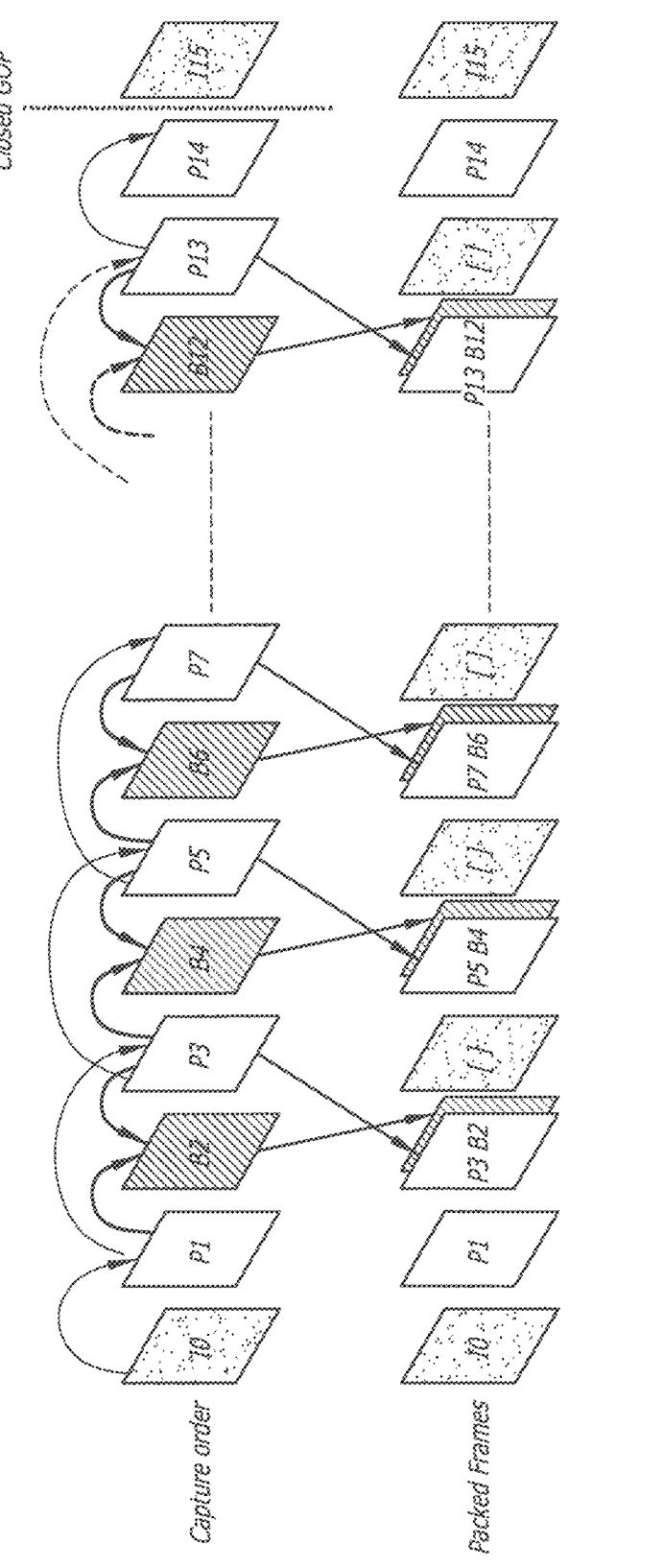
FIG. 6 is a conceptual illustration of frame packing of B frames in a conventional AVI container.

The two flags, Presentation Number and Requires Reference Packing may be used in aiding with the packing of reference frames. It is a well-known problem that in cases where the decoder requires a one-frame-in, one-frame-out relationship, all the frames required for decoding a predicted frame must be supplied together to the decoding device. In those scenarios, one commonly used solution has been to group the frames as a packed frame and to follow this packed frame by empty or marker chunks (often designated as [ ]). A sequence of packed frames and marker chunks is shown in FIG. 6.

Figure 7:
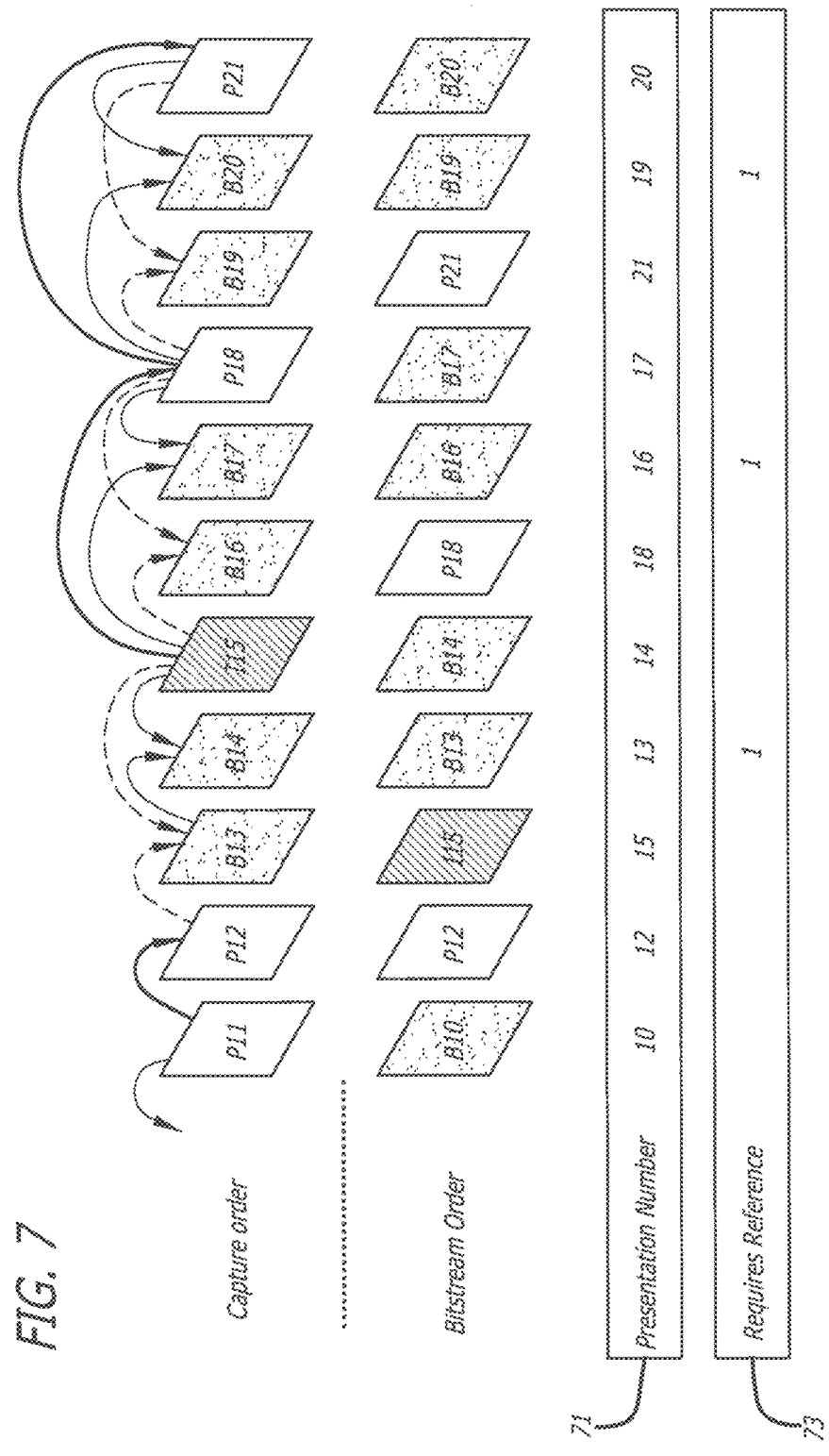
FIG. 7 is a conceptual illustration of a frame sequence including B frames in a container in accordance with an embodiment of the invention.

Instead of the traditional packing structure, here we provide for the use of two stream markers termed "Presentation Number" 71 and "Requires Reference" 73. With the presence of these two stream markers, it is possible to create a stream of single frames in each individual chunk and use these marker values in creating a representative packed frame sequence for the special decoding scenarios. A sequence of frames, the ordering of the frames in a container in accordance with an embodiment of the invention and chunk header information concerning presentation order is shown in FIG. 7. The Presentation Number may be a number specifying the order in which the decoded chunk data should be presented, and can be 8, 16, 24, 32 or any number of bits. The Requires Reference sub-flag marks frames that require reference packing in scenarios that must support a one-frame-in, one-frame-out scenario. This sub-flag may or may not have a corresponding value in the header data fields. The same sub-flags and packetization can be used to incorporate open and closed GOP encapsulation. The important distinction between the use of these sub-flags and the previously used reference packing streams is that in this method, every frame will be individually stored and only the sub-flags may be used to infer a specific framing structure.

Forward and Backward Access Sub-Flags

Figures 8, 9A, 9B, 9C:
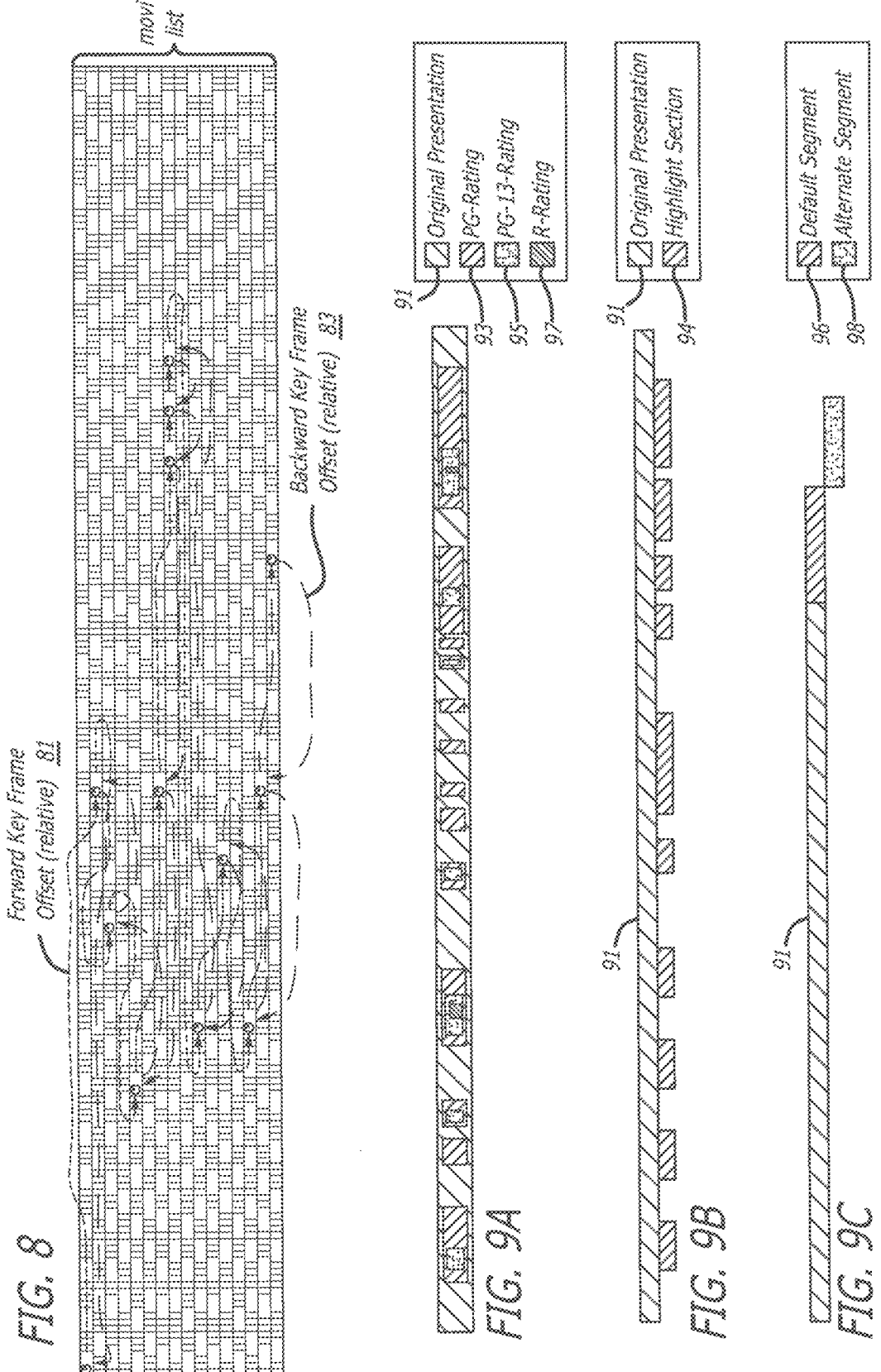
FIG. 8 is a conceptual illustration of key frame references contained within the chunk headers in accordance with embodiments of the invention.
FIG. 9a is a conceptual illustration of content filtering information contained within the chunk headers of chunks of multimedia information contained within a container in accordance with an embodiment of the invention.
FIG. 9b is a conceptual illustration of highlight information contained within the chunk headers of chunks of multimedia information contained within a container in accordance with an embodiment of the invention.
FIG. 9c is a conceptual illustration of alternate segment information contained within the chunk headers of chunks of multimedia information contained within a container in accordance with an embodiment of the invention.

The Forward and Backward Access (key) Frame Offset sub-flags 81,82 indicate the presence of an offset field in the header-data section of the chunk header which provides a pointer to the previous and next access or key-frame chunk. An access chunk is typically one which can be decoded independently of any other chunks and generally serves as an access point during seek and trick-play operations. The offset may be a relative value from the current position of the pointer, or alternatively with a larger bit-field representation the offset can be an absolute one from the beginning of the file. A possible use case for access (key) frame offset pointers in accordance with an embodiment of the invention is illustrated in FIG. 8. The forward access flag 81 directs a playback device to extract the forward access offset that points to the next key frame. At the next key frame, a forward access flag and offset data field provides a reference to the next key frame. As such, from each key-frame the playback device can seek or jump ahead to the next key frame utilizing only the forward access flag and offset data field. This accelerates trick-play/seek functions and reduces processor overhead of the playback since the playback device does not have to traverse and/or decode the each entire chunk.

The inclusion of the flag and data field however increases the size of the media file. In one embodiment, the offset data field is stored initially or progressively as the media file is played. Storing each offset data field prior to playback can slow the initial playback of the media file, but also enhances trick-play functions and reduces overall processor time with the processing time to decode only the flag and data field adding to the overall processor time. With reduced processor overhead and immediate access to the next frame, playback of the content appears visually smoother.

The backward flag 82 and offset data field is similar to the forward flag 81 however the backward offset references to a previous key frame. However, it should be appreciated that in conventional playback devices backward or rewind functions can't be performed or are extremely limited without retaining and/or decoding the entire media file. For example, after playing a portion of the media file, the portion is discarded before playing the next portion, and thus reversing direction requires retrieving the previous portion and finding the previous key frame. This is also further limited by most container formats of the media file. For example, without a fixed size or a marker to the previous key frame, the playback device has to decode the previous portion of the media file to find the previous key frame. Furthermore, some consumer electronic devices are not sophisticated and are thus not able to perform extensive processing functions to retrieve, locate and decode the previous frame within a user's desired wait time.

In one embodiment, similar to the flags above, the media file instead includes an element with a unique backward access identifier followed by a backward offset data field, e.g., within the payload data, that has a pointer to a previous key-frame block, a value that corresponds to a previous key-frame time code or timestamp, or an offset value calculated relative to a start position, e.g., at the beginning of the file or relative to a frame being displayed. Likewise, a forward access identifier and forward offset data field can also be included that points, provides a timestamp to the next key-frame, or an offset value relative to a start position. It should be appreciated that although flags and data fields are described throughout the application other similar types of advance identifiers such as unique element identifiers along with the associated data fields or payload are also applicable based on the container format of the media file desired or provided.

DRM and Metadata Flags

The DRM Packet and Frame Metadata sub-flags signal the presence of information in the header data fields which identifies the data type, and is followed by a number of related bytes in the header data fields. The DRM Packet sub-flag signifies specific Digital Rights Management (DRM) data, which may be used in the decryption of the information contained in the chunk. Many previous implementations of DRM in the context of an AVI container have required DRM information to be contained in a separate chunk that is interleaved with the elementary streams. In the embodiments described above, DRM information can be included in the chunk containing the frame (or other information) to which it relates. The Frame Metadata sub-flag indicates the presence of metadata related to the frame contained within the chunk, which may be used in some form of identification and classification. The header data fields associated with the DRM Packet and Frame Metadata sub-flags can be identified via a set of pre-determined rules, or alternatively may be identified via specifications provided in a separate section of the file. These concepts can likewise be added to the MKV specification by creating new elements as part of an audio or video Block which is an equivalent of the chunk in the AVI container.

Other examples of utilizing metadata is described in U.S. Provisional patent application Nos. 61/059,547, filed Jun. 6, 2008, and 61/109,476, filed, Oct. 29, 2008, the disclosures of which are hereby incorporated by reference as if set forth in full herein.

Content Filter Flags

The Content Filtering sub-flag indicates the presence of information in the header-data section related to chunk-level content-filtering information. The content-filtering can apply to any circumstance where a portion of the content is to be selectively presented, anywhere up to the entire length of the presentation. It can apply selectively to the different streams in an overall presentation, where the behavior of the filtering can be determined by a set of pre-defined rules. The presentation rules can define the behavior of the decoding device in each case, such as muting an audio track, blackening the video track, or skipping a portion of the presentation altogether. In many embodiments, a 16-bit identifier in the header-data can be used to signal up to 16 different types of content-filtering options for a particular chunk, although the field may be specified to have a larger value. A corresponding header data field can indicate the level for each one of the 16 filtering modes. Some example filter types may be the following:

| Identifier Mask | Designation |
| --- | --- |
| 0x1 | Hierarchical, Inclusive |
| 0x2 | Hierarchical, Exclusive |
| 0x4 | Alternate Segment |
| 0x8 | . . . |

The primary use of chunk accurate content filtering is to add flexibility in presenting the same stream in a different form, based on a series of filtering levels and types. For example, the same content may be presented to adults, and a different version may be shown to children. A multimedia presentation containing content filtering information (original presentation 91, PG rating section 93, PG-13 rating section 95, R rating section 97) in accordance with an embodiment of the invention is shown in FIG. 9a. Alternatively, a presentation may contain a shortened 'highlight' section, which will display only certain portions of the materials (highlight section 94). A multimedia presentation containing highlight filtering information in accordance with an embodiment of the invention is shown in FIG. 9b. A presentation may also contain alternate segments, which can be shown in place of one another. A multimedia presentation including alternate segments (default segment 96, alternate segment 98) indicated in accordance with an embodiment of the invention is shown in FIG. 9c.

All of the content-filtering scenarios described above can apply to the same stream. In many embodiments, up to 16 different filtering modes can be defined with overlapping functionality; hence, more than one filtering mode could be specified per chunk in which case the different levels follow the order of the bit-field sub-flag. Each mode can have at least one byte defining its level. The definition of the level and its designation may be either previously specified or alternatively described in a different segment of the container. Other examples of utilizing content filtering is described in U.S. Provisional Patent application Nos. 61/059,547, filed Jun. 6, 2008, and 61/109,476, filed, Oct. 29, 2008, filed, the disclosures of which are hereby incorporated by reference as if set forth in full herein.

New Configuration Sub-Flag

The New Configuration sub-flag is a 2 bit flag representing a new configuration for the decoding operation of the current chunk and all subsequent chunks. The sub-flag can indicate the presence of an index, which selects a particular configuration from a list of previously defined values or alternatively from parameters defined separately in a different segment of the file. Alternatively, the flag may indicate the presence of actual configuration information in the header-data that can specifically describe the features of the stream such that a decoder is able to successfully decode and present the information in a synchronized manner. Using a list of previously defined values requires analyzing a large number of presentation streams and selecting the most common configurations for each track. This pre-determined list of configurations can be published separately and selected via the Configuration Index parameter in the header-data. The signaling of a New Configuration in the same manner can be incorporated into the MKV container by defining a new element which defines the same structure as described above.

Extension Sub-Flag

The flags EXTENSION sub-flags can be used to indicate that additional bytes of flags are included in the chunk header. In other embodiments, other techniques can be used to indicate the presence of additional flags. Although specific sub-flags are outlined above, other types and/or combinations of sub-flags can be included in flags of a chunk header in accordance with embodiments of the invention that provide information concerning a chunk to a player.

In general, the use of flags and corresponding data create an optional-inclusion approach which can help keep the overhead of additional features very small while at the same time allow for their inclusion where and if necessary. It is important to note that while this disclosure has described a specific relationship between the flags, sub-flags, header data fields, and supplemental data appearing in the AVI chunk header, the chunk header is generally expandable in accordance with embodiments of the invention using these components.

Figure 10:
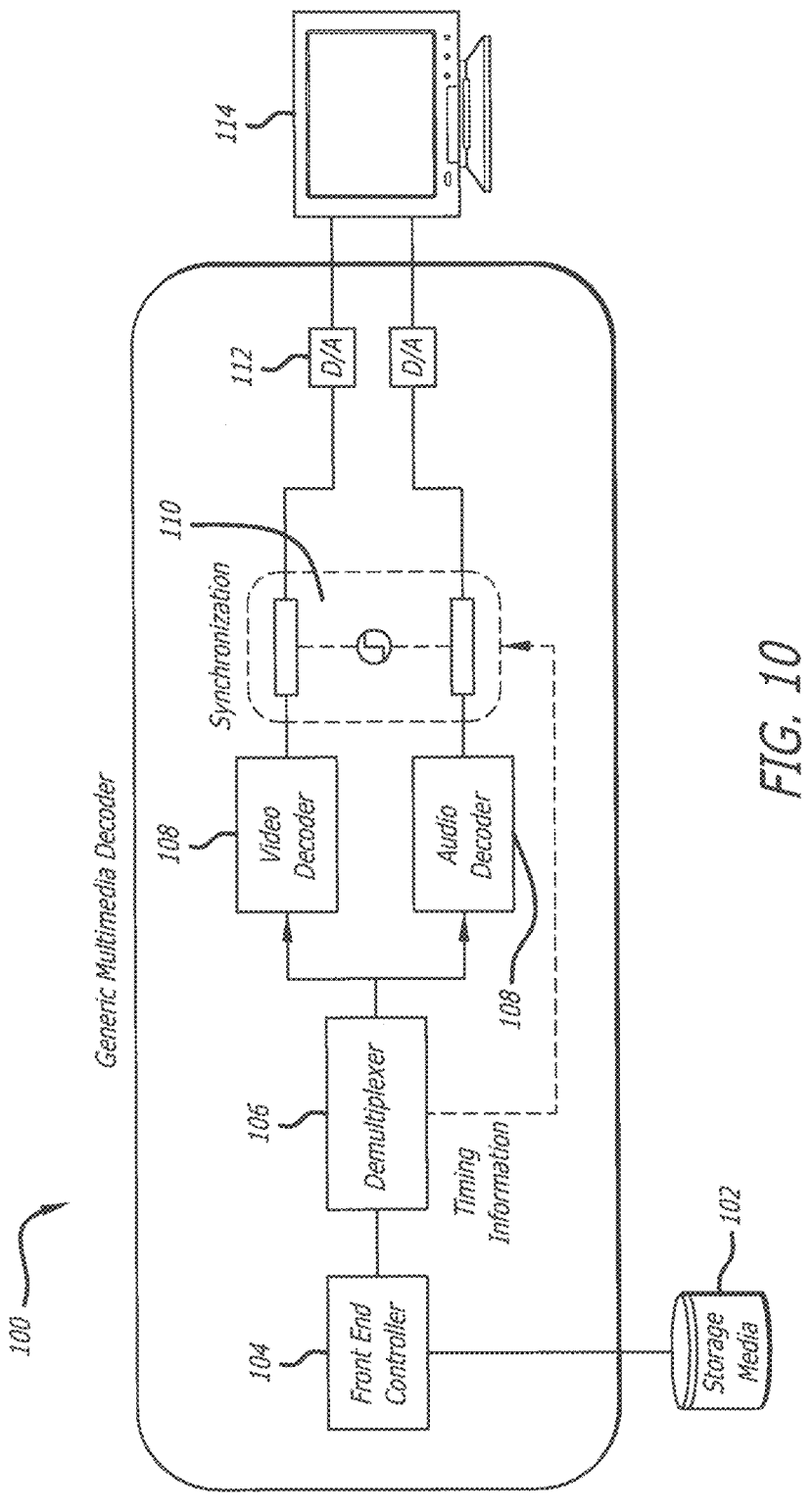
FIG. 10 is a semi-schematic illustration of a content player in accordance with an embodiment of the invention.

A player configured to decode a multimedia presentation formatted in accordance with an embodiment of the invention is illustrated in FIG. 10. The player 100 retrieves chunks of information from files containing multimedia presentations that are stored on a storage media 102 using a front end controller 104. The chunks are provided to a demultiplexer 106 that processes the file and has the capability of deciphering specific information about a container (the AVI & MKV containers being example containers capable of being deciphered by the multiplexer). The demultiplexer deciphers the container information and separates the various components and transfers them to their appropriate decoder unit. Chunks that form part of the elementary streams are directed to queues where the chunks are held pending decoded by decoders 108. The decoded chunk data is provided to synchronization circuitry 110, which ensures that the elementary streams are synchronized prior to their output by output devices 112 for rendering by a display device such as a television or a computer monitor 114. In many embodiments, the demultiplexer conveys timing information extracted from chunk headers to the synchronization circuitry to enable synchronized playback of the decoded information. As discussed above, the information provided to the player by the flags and header data fields in each chunk can enable the demultiplexer to make a number of decisions concerning the queuing and decoding of chunk information without reference to other chunks within the multimedia file. In players that read multimedia information from fixed media or that request information via a network, obtaining information from various locations within a file can be cumbersome and the presence of required information within a chunk can reduce latency within the player.

Figure 11:
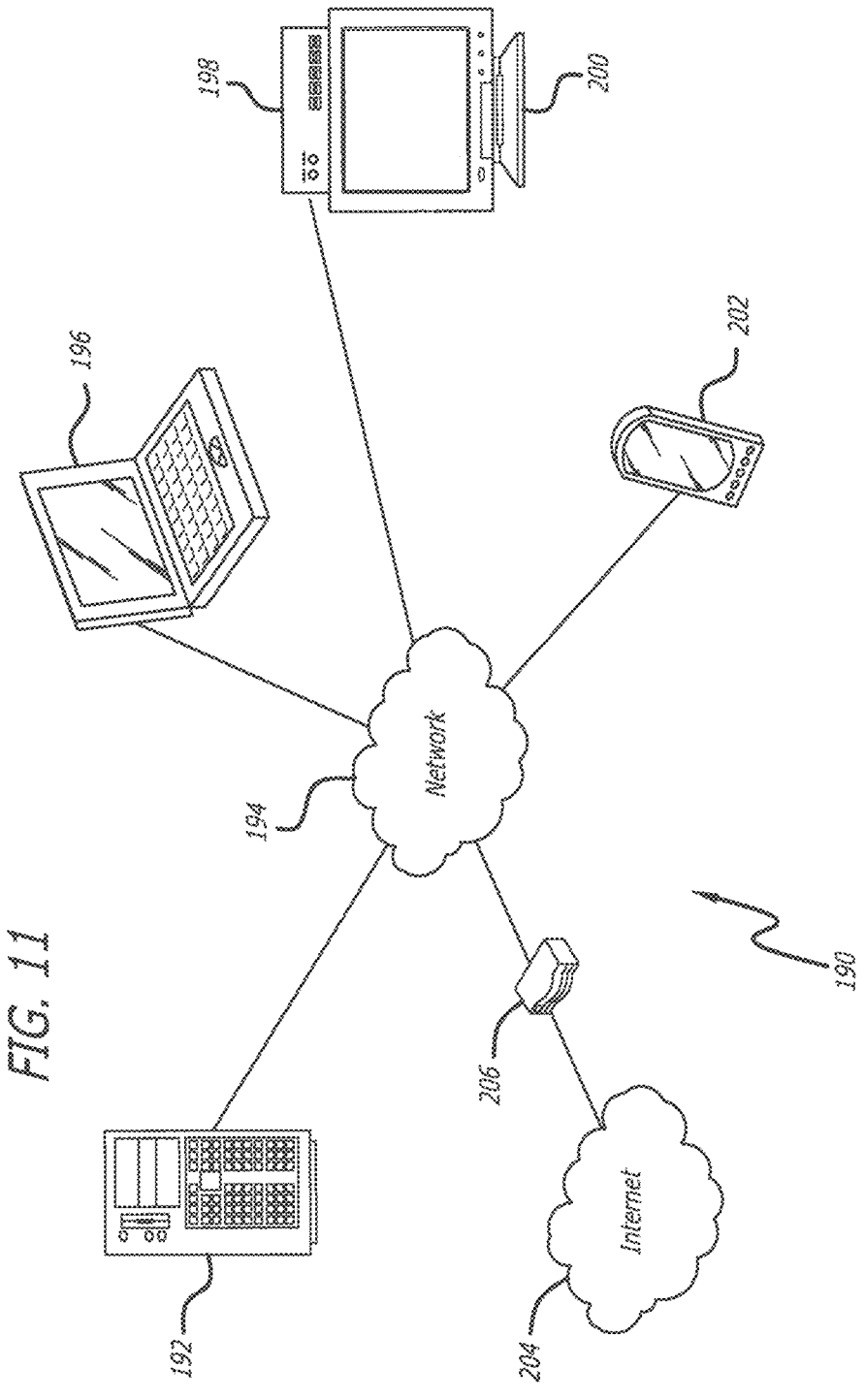
FIG. 11 is a semi-schematic network diagram of progressive playback system in accordance with an embodiment of the invention.

Referring now to FIG. 11, a progressive playback system in accordance with an embodiment of the invention is shown. The progressive playback system 190 includes a media server 192 connected to a network 194. Media files are stored on the media server 194 and can be accessed by devices configured with a client application. In the illustrated embodiment, devices that access media files on the media server include a personal computer 196, a consumer electronics device such as a set top box 18 connected to a playback device such as a television 200, and a portable device such as a personal digital assistant 202 or a mobile phone handset. The devices and the media server 192 can communicate over a network 194 that is connected to the Internet 204 via a gateway 206. In other embodiments, the media server 192 and the devices communicate over the Internet.

The devices are configured with client applications that can request portions of media files from the media server 192 for playing. The client application can be implemented in software, in firmware, in hardware or in a combination of the above. In many embodiments, the device plays media from downloaded media files. In several embodiments, the device provides one or more outputs that enable another device to play the media. When the media file includes an index, a device configured with a client application in accordance with an embodiment of the invention can use the index to determine the location of various portions of the media. Therefore, the index can be used to provide a user with "trick play" functions. When a user provides a "trick play" instruction, the device uses the index to determine the portion or portions of the media file that are required in order to execute the "trick play" function and requests those portions from the server. In a number of embodiments, the client application requests portions of the media file using a transport protocol that allows for downloading of specific byte ranges within the media file. One such protocol is the HTTP 1.1 protocol published by The Internet Society or BitTorrent available from www.bittorrent.org. In other embodiments, other protocols and/or mechanisms can be used to obtain specific portions of the media file from the media server.

Figure 12:
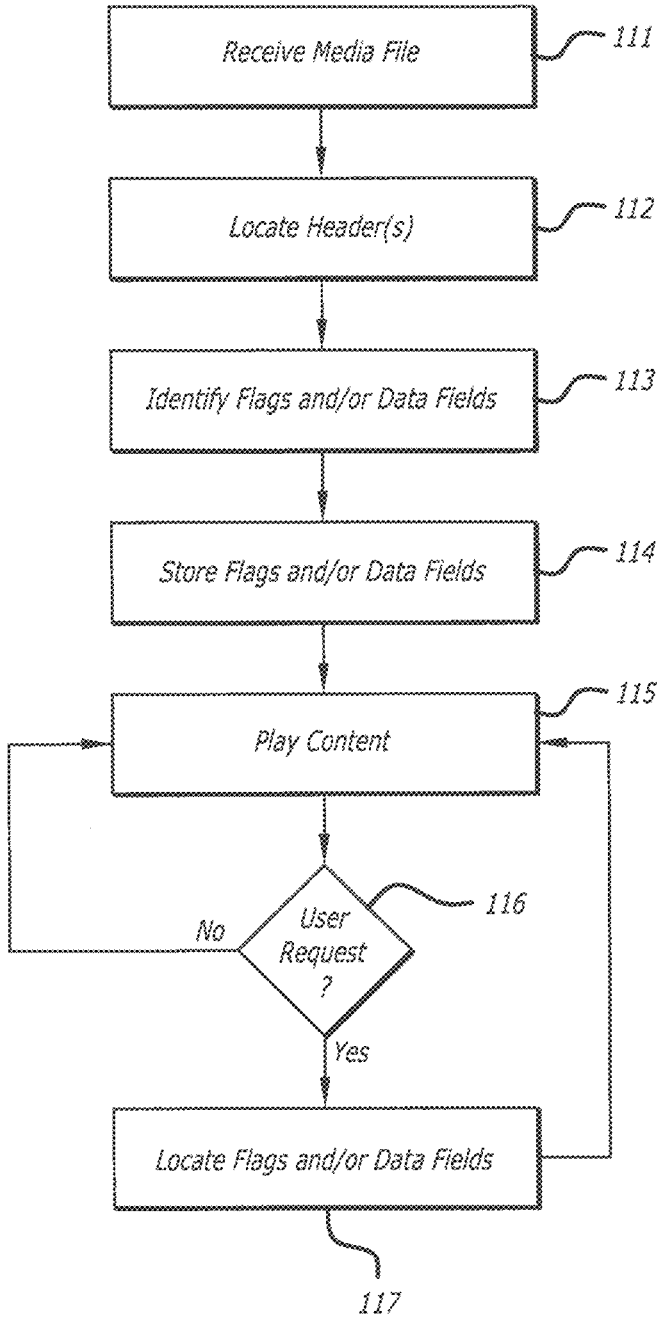
FIG. 12 is a flowchart of a process utilizing chunk information within a multimedia file in accordance with an embodiment of the invention.

Referring to FIG. 12, one embodiment of a process of utilizing the chunk and flag structure is shown. A media file is received from, for example, a media server based on a media file request from a playback device or in particular a playback engine of the playback device (111). Upon locating the requested media file, the media server transmits all or some portions at a time of the media file to the playback device. The playback device in one embodiment decodes the transmitted media file to locate the header portion of the media file (112). The located header portion is decoded to identify flags and/or associated data fields within the header portion (113). In one embodiment, the flags and/or associated data fields are stored or cached into memory to facilitate access to the flags and/or data fields (114). The media file is decoded and displayed based on the flags and/or data fields identified (115). If there is a user request (116), e.g., a forward seek request, the associated flag and/or data fields are located and/or retrieved from storage (117). Based on the flags and/or data fields, portions of the media file are located and/or displayed to comply with a user request received by the playback device (115). The process continues until terminated by the user.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of playing back content by a playback device, the method comprising:

downloading, using a playback device, at least a portion of a media file having content data, wherein the at least a portion of the media file comprises chunks of content data, the content data having a plurality of frames of encoded video, wherein each of the chunks comprises:

a series of flags and a plurality of data fields, wherein the series of flags comprises a timestamp information flag that identifies whether a set of additional flags are included in the chunk, wherein the set of additional flags comprises a set of at least one additional timestamp information flag that indicates the presence of additional timestamp information within the plurality of data fields of the chunk, wherein the additional timestamp information defines a resolution of the timestamp information of the chunk;

decoding a frame of the plurality of frames of encoded video by decoding the chunk to identify the series of flags, the set of additional flags, the set of at least one timestamp information flags, and the content of the plurality of data fields; and displaying the decoded frame of encoded video on a display using the playback device.

2. The method of claim 1, wherein a first flag in the set of at least one additional timestamp information flags indicates that the timestamp information of the chunk includes a value expressed in units of hours.

3. The method of claim 1, wherein a second flag in the set of at least one additional timestamp information flags indicates that the timestamp information of the chunk includes a value expressed in units of minutes.

4. The method of claim 1, wherein a third flag in the set of at least one additional timestamp information flag indicates that the timestamp information of the chunk includes a value expressed in units of seconds.

5. The method of claim 1, wherein the series of flags and the plurality of data fields are located in a header of each chunk of content data.

6. The method of claim 5, wherein the header further comprises a plurality of elements that each contain a unique identification field, size and data fields.

7. The method of claim 1, wherein the series of flags and the plurality of data fields reference portions of a frame of encoded video.

8. The method of claim 1, wherein each flag of the series of flags has a one-to-one corresponding reference to each data field of the plurality of data fields.

9. The method of claim 8, further comprising decoding a chunk in which at least one flag of the series of flags is decoded.

10. The method of claim 9, further comprising bypassing decoding of a remainder of the chunk based on the decoded flag.

11. A non-transitory computer readable medium containing processor instructions for playing back content by a playback device, where execution of the instructions by a processor causes the processor to perform a process that comprises:

downloading, using a playback device, at least a portion of a media file having content data, wherein the at least a portion of the media file comprises chunks of content data, the content data having a plurality of frames of encoded video, wherein each of the chunks comprises: a series of flags and a plurality of data fields, wherein the series of flags comprises a timestamp information flag that identifies whether a set of additional flags are included in the chunk, wherein the set of additional flags comprises a set of at least one additional timestamp information flag that indicates the presence of additional timestamp information within the plurality of data fields of the chunk, wherein the additional timestamp information defines a resolution of the timestamp information of the chunk;

decoding a frame of the plurality of frames of encoded video by decoding the chunk to identify the series of flags, the set of additional flags, the set of at least one timestamp information flags, and the content of the plurality of data fields; and displaying the decoded frame of encoded video on a display using the playback device.

12. The non-transitory computer readable medium of claim 11, wherein a first flag in the set of at least one additional timestamp information flags indicates that the timestamp information of the chunk includes a value expressed in units of hours.

13. The non-transitory computer readable medium of claim 11, wherein a second flag in the set of at least one additional timestamp information flags indicates that the timestamp information of the chunk includes a value expressed in units of minutes.

14. The non-transitory computer readable medium of claim 11, wherein a third flag in the set of at least one additional timestamp information flag indicates that the timestamp information of the chunk includes a value expressed in units of seconds.

15. The non-transitory computer readable medium of claim 11, wherein the series of flags and the plurality of data fields are located in a header of each chunk of content data.

16. The non-transitory computer readable medium of claim 15, wherein the header further comprises a plurality of elements that each contain a unique identification field, size and data fields.

17. The non-transitory computer readable medium of claim 11, wherein the series of flags and the plurality of data fields reference portions of a frame of encoded video.

18. The non-transitory computer readable medium of claim 11, wherein each flag of the series of flags has a one to one corresponding reference to each data field of the plurality of data fields.

19. The non-transitory computer readable medium of claim 18, further comprising decoding a chunk in which at least one flag of the series of flags is decoded.

20. The non-transitory computer readable medium of claim 19, further comprising bypassing decoding of a remainder of the chunk based on the decoded flag.

\* \* \* \* \*